3,213,129
COMPOSITION CONSISTING OF A MERCAPTO COMPOUND AND AN ORGANIC PHOSPHORUS ACID DERIVATIVE AS A COLOR STABILIZER

Peter Berth, Dusseldorf-Benrath, Bruno Blaser, Dusseldorf-Urdenbach, Hans-Gunther Germscheid, Hosel, and Karl-Heinz Worms, Dusseldorf, Germany, assignors to Therachemie chemisch therapeutische Gesellschaft m.b.H., Dusseldorf, Germany
No Drawing. Filed Dec. 13, 1961, Ser. No. 159,167
Claims priority, application Germany, Dec. 15, 1960,
T 19,435
1 Claim. (Cl. 260—501)

The invention relates to agents for the treatment of sulfur-containing scleroproteins and to their manufacture, and, more particularly to the prevention of discolorations of such agents.

Agents for the treatment of sulfur-containing scleroproteins frequently are employed which contain substituted mercapto groups. Compounds, such as mercaptoalkane sulfonic acids, mercaptoalcohols, e.g., thioglycerol, and mercaptocarboxylic acids, especially thiolactic acid and thioglycolic acid are utilized. In lieu of the free acids, their alkali-, ammonium- or monoethylamino salts often are employed. Agents of that kind preferably serve for the shaping of hair or as additives to hair dyes to improve their action on the hair. They also find use in the shaping of woollen textiles or of textiles consisting of wool mixed with other materials, for instance, to install a permanent crease in trousers or of permanent pleats in skirts.

The agents above described tend toward ready discoloration during manufacture, packing, storage, upon dilution and use, unless special precautions are observed. The discoloration imparts poor appearance to the agents and also easily causes stain formation.

Unexpectedly, these drawbacks of the agents for the treatment of sulfur-containing scleroproteins can be overcome when the means according to the invention are employed. These means consist in that the agents, aside from the above-named substituted mercaptans, contain an additive or organic acylation products of phosphorus acid having at least two phosphorus atoms in their molecules, or derivatives of these acylation products Substituted mercaptans usable for the purpose according to the invention are, among others, mercaptoalkane sulfonic acids, mercaptoalcohols, e.g., thioglycerol, and mercaptocarboxylic acids, such as mercaptosuccinic acid, mercaptopropionic acid, thiolatcic acid, and especially mercaptoacetic acid, also known as thioglycolic acid. Water-soluble derivatives of these compounds, i.e., their esters, salts or amides, likewise can be used.

The acylation products of phosphorus acid employed according to the invention can be produced by several different methods known per se, e.g., by reacting phosphorus acid with an excess acetic anhydride or with acetyl chloride, or with a mixture of both these compounds. The reaction usually is carried out at 20 to 140° C. In lieu of acetic acid derivatives other aliphatic carboxylic acid anhydrides or chlorides having 3 to 6 carbon atoms in their molecules, can be used. The acylation products, depending upon the method of producing the same, are obtained either as pure products or in the form of mixtures. All of them contain at least two phosphorus atoms in each molecule.

Of products having a well-defined constitution, particularly the compound having the Formula 1 is to be named:

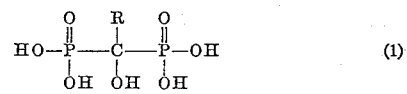

(1)

wherein R denotes an alkyl radical having 1–5 carbon atoms.

In lieu of the acids, the corresponding alkali salts often are employed in practice, such as the sodium-, potassium- and ammonium salts, also the salts thereof with ethanolamine. The compounds named can be added to the agents for the treatment of sulfur-containing scleroproteins at any time desired. The addition, hence, can be made initially during the production of the agents. It also can be accomplished afterward and then particularly serves to restore the original color of compounds which already had discolored and had become unsightly.

The acylation products of phosphorus acid are added, according to the invention, to the agents generally in quantities of 0.1 to 5 percent by weight, and preferably in amounts of 0.5 to 2 percent by weight. Larger amounts can be used, but no further practical advantages are derived therefrom.

The agents thus fortified also may contain, particularly in the case of hair treating agents, other desired additives, depending upon the end use, such as perfumes, colorants, thickeners, such as cellulose derivatives, polyvinylprrolidone, polyacrylates, and also surface-active materials.

The latter particularly consist of fatty alcohol sulfates, alkybenzene sulfonates, condensation products of fatty alcohols having 12 to 18 carbon atoms in their molecules with ethylene oxide, and cetylpyridium chloride.

The additives named in the paragraph above are present in the customary quantities. The agents thus produced are especially suited for use as hair treating materials, for the shaping of human hair or for the improvement of the dyeability of hair. However, animal hair, especially furs and pelts, also can be treated with the agents containing mercaptocarboxylic acids or their derivatives. They also can be used for the shaping of woollen textiles or wool-containing textiles, as stated above.

The invention now will be further explained by the following examples. However, it should be understood that these are given merely by way of illustration, not of limitation, and that numerous changes may be made in the details without departing from the spirit and the scope of the invention as hereinafter claimed.

All parts given in the examples are parts by weight unless otherwise specified.

Example 1

An emulsion was prepared from 1 part paraffin oil,
1 part fatty alcohol (chain length $C_{12}$ to $C_{18}$),
1 party of a condensation product of a fatty alcohol ($C_{12}$–$C_{18}$) with 8 to 10 mols ethylene oxide,
6 parts thioglycolic acid,
9 parts ammonia (25% by weight), 1.6 parts of a 1 percent solution of a dye in water having the composition of Formula 2:

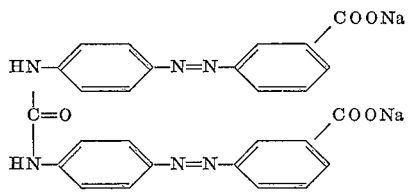

1 part perfume oil,
79.4 parts water.

This emulsion, after large-scale production, had a dirty brown color. The addition of 0.6 part of the reaction product of acetyl chloride with phosphorus acid restored the initial pure light yellow color.

The product thus obtained is very effective in imparting to human hair a permanent curl of excellent elasticity.

*Example 2*

At a temperature of approximately 80° C., 100 parts paraffin oil, 100 parts fatty alcohol ($C_{12}$–$C_{18}$), and 100 parts of a condensation product of a fatty alcohol ($C_{12}$–$C_{18}$) with 8–10 mols ethylene oxide are melted together under addition of a small amount of perfume oil. To this melt then are added 7.940 parts water at 85° C. and 60 parts of an acylation product of phosphorus acid, produced according to the directives given in JACS 34, 492–499. To this mixture are added 600 parts thioglycolic acid, 900 parts 25% ammonia and 160 parts dye of the same composition as in Example 1 in a 1 percent solution in water. A pure yellow cold wave emulsion thus is produced which exhibits no discoloration and has very good waving strength.

*Example 3*

For the manufacture of a permanent wave solution, ready for use, 25 parts by volume of a concentrate containing 24 percent by weight ammonium thioglycolate were thinned with tap water (hardness 24°) to 100 parts by volume. The 6 percent ammonium thioglycolate solution thus obtained had a pH of 9.5 and exhibited a red-purpoe discoloration. The latter disappeared immediately upon the incorporation of 0.6 part of a reaction product of acetyl chloride with phosphorus acid. This solution imparted a good curl of high elasticity to human hair when treated therewith.

*Example 4*

A solution, ready to use, for the production of a permanent crease in woollen textiles is obtained by dissolving 3 parts ammonium thioglycolate and 3 parts of a reaction product of acetyl chloride with phosphorus acid (prepared as explained in Example 2) in water, adjusting the pH to 9 with ammonia and bringing the solution to 100 parts by addition of water. The solution thus produced is sprayed onto the well-moistened woollen material, allowed to act thereon for several minutes, and then is ironed with a flat iron having a temperature of at least 140–150° C. for 2 minutes. A crease, free from discolorations and of good elasticity and wash resistance thus is obtained.

*Example 5*

6 parts fatty alcohol ($C_{12}$–$C_{18}$), 4 parts of a fatty alcohol sulfonate, and 1 part perfume oil are melted together at substantially 85° C. and emulsified within 60 parts water at 85° C. In the emulsion thus obtained 1 part of an acylation product of phosphorus acid (prepared as explained in Example 2), 7 parts thiolactic acid and 10 parts 25% ammonia are dissolved, and the mixture brought to 100 parts by addition of water. A pure white cream resulted which did not discolor either upon prolonged storage nor upon application to human hair, on which this cream produced a permanent curl of excellent elasticity.

*Example 6*

An emulsion prepared as in Example 1 had a dirty brown discoloration after production. 1 part of a reaction product of propionyl chloride with phosphorus acid was added to the emulsion whereby the initial pure yellow color was restored.

*Example 7*

A 7.5 percent aqueous ammonium thioglycolate solution, after dilution with tap water, had a pH of 9.5 and showed a reddish-brown discoloration. It was restored to its natural color by incorporation of 0.6 part of a reaction product butyric acid anhydride with phosphorus acid. The solution thus obtained imparted a very good permanent curly to human hair.

*Example 8*

To an emulsion as described in Example 5, 3 parts of a reaction product of caproyl chloride with phosphorus acid were added. A pure white permanent wave cream was obtained.

We claim as our invention:

An agent for the treatment of sulfur-containing scleroproteins resistant to discoloration, said agent consisting of a mixture composed of a compound selected from the group consisting of thioglycerol, mercaptosuccinic acid, mercaptoproprionic acid, thiolactic acid, thioglycolic acid, and their alkali-, ammonium- and monoethylamino salts; plus 0.1 to 5 percent by weight of a compound having the formula

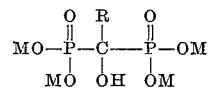

wherein R denotes an alkyl having 1 to 5 carbon atoms; and wherein M is selected from the group consisting of hydrogen; sodium-, potassium-, ammonium- and ethanolamine radicals.

References Cited by the Examiner

UNITED STATES PATENTS

| | | | |
|---|---|---|---|
| 2,443,835 | 6/48 | Pederson | 260—609 |
| 2,631,965 | 3/53 | Schnell | 260—526 |
| 2,809,131 | 10/57 | Walden et al. | 260—123.7 |
| 3,063,908 | 11/62 | Kalopissis | 167—87.1 |

LORRAINE A. WEINBERGER, *Primary Examiner.*

CHARLES B. PARKER, LEON ZITVER, *Examiners.*